United States Patent Office 2,975,025
Patented Mar. 14, 1961

2,975,025

METHOD OF SELECTIVELY REMOVING OXIDES OF NITROGEN FROM OXYGEN-CONTAINING GASES

Johann G. E. Cohn, West Orange, Duane R. Steele, Newark, and Holger C. Andersen, Morristown, N.J., assignors, by mesne assignments, to Engelhard Industries, Inc., Newark, N.J., a corporation of Delaware No Drawing. Filed Nov. 5, 1957, Ser. No. 694,502

20 Claims. (Cl. 23—2)

This invention relates to the selective removal of oxides of nitrogen from an oxygen-containing gas, and more particularly pertains to the selective removal of oxides of nitrogen from the waste gases produced by the oxidation of ammonia in the production of nitric acid.

In the production of nitric acid by the oxidation of ammonia, it is difficult to convert all of the oxides of nitrogen to nitric acid, and as a result of the incomplete conversion of these oxides, they are discharged with the waste or tail gases. The presence of such oxides in the waste gases is undesirable as they are of a corrosive nature and constitute a pollution problem.

The waste or tail gases of nitric acid processes generally have a composition on a dry basis of 0.1 to 0.5 percent by volume of mixed nitric oxide and nitrogen dioxide, about 3–4 percent by volume of oxygen, and the remainder is nitrogen. In addition, various amounts of steam may be included with the waste gas.

In copending application Serial Number 615,496, filed October 12, 1956, there is disclosed a single stage catalytic process for the purification of waste or tail gases wherein oxides of nitrogen are eliminated while heating values of the waste gases are simultaneously recovered. In this process, the oxygen present in the waste gases is removed by a catalytic combustion reaction, and the oxides of nitrogen are reduced to nitrogen and water. In catalytic processes of this type, it has been found that it is generally necessary to have a fuel present in a stoichiometric excess over the oxygen content of the waste gas, and under such conditions a very large quantity of heat is generated in the catalyst bed.

The high temperature attained by the catalyst is detrimental in that a loss of catalyst activity results, and the problem becomes of greater magnitude with increasing oxygen concentration in the waste or tail gases.

In copending application Serial Number 650,860, filed April 5, 1957, one method of overcoming the foregoing deficiencies is disclosed in which the removal of oxygen and the catalytic reduction of oxides of nitrogen in waste or tail gases is effected in two stages in such a manner that only a part of the total heat is generated in each stage. The temperature to which the catalyst is subjected is thus decreased and its life activity are correspondingly extended.

In the process disclosed in each of the copending applications supra, it has been found that in order to effect reasonably complete removal of oxides of nitrogen, an excess of fuel over the oxygen and nitric oxide content is required; this requirement apparently results from the fact that Reaction 1 is faster than Reaction 2:

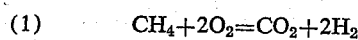

(1)     $CH_4 + 2O_2 = CO_2 + 2H_2O$
(2)     $CH_4 + 4NO = CO_2 + 2H_2O + 2N_2$

In these equations, methane is used as the exemplary fuel, but other fuels show the same behavior.

In an important practical application, such as the treatment of a nitric acid plant waste or tail gas containing, by volume, 4 percent $O_2$, 0.3 percent NO, and 95.7 percent $N_2$, this means that approximately 28 times as much fuel is required as would be required if the fuel reacted with the nitric oxide only, and if the latter condition be realized, the process could be said to be perfectly selective.

Reaction of the fuel with oxygen is not disadvantageous in all cases, since a large amount of heat is generated which may be economically recoverable. However, the recovery system is expensive to install and, in existing plants, it may be impractical to incorporate such a recovery system.

Accordingly, it is desirable in some cases to effect the removal of oxides of nitrogen from waste or tail gases selectively, i.e. without appreciable consumption of the oxygen present in the gases and, in accordance with the present invention, it has been found that the use of ammonia as a fuel, in combination with a supported platinum group metal-containing catalyst, effects the selective removal of oxides of nitrogen from a nitrogen-containing gas.

The catalyst used in the process of this invention may be a platinum group metal-containing catalyst per se on a suitable support, or a platinum group metal in admixture with another of the platinum group metals, i.e. platinum, palladium, rhodium, ruthenium, iridium and osmium. Suitable catalyst supports are alumina, including activated alumina and the like, silica, silica gel, diatomaceous earth and other similar metal catalyst supports. For optimum conversion, the catalyst metal should be within the range of about 0.01 percent to about 2 percent by weight of the catalyst metal and support. The support for the catalyst metal may be in the form of pellets, granules or powder, and preferably comprises activated alumina. The supported catalyst may be prepared in any suitable manner, i.e. by treating the carrier or support with a solution of a suitable metal compound, and then reducing the metal compound to metal.

The compositions of the gases which may be treated in accordance with this invention include those gases containing, by volume, from 0 to 22 percent oxygen, 0 to 2 percent nitric oxide, and 0 to 2 percent nitrogen dioxide, the balance being an inert gas such as nitrogen, argon, helium and the like. The preferred range of gas composition is, by volume, 0 to 7 percent oxygen, plus 0 to 1 percent nitric oxide with the remainder being inert. The gas mixture may also contain water vapor in amounts up to about 8 percent by volume.

The fuel used is ammonia and it may be added to the gas mixture to be treated in an amount in the range of the stoichiometric quantity required for reaction with nitric oxide to ten times or more the quantity required, preferably less than two times the quantity required.

The mixture of gas to be treated and ammonia fuel is passed over the catalyst at a space velocity in the range of about 3,000 to 100,000 standard volumes of gas per volume of catalyst per hour, preferably about 3,000 to 30,000 standard volumes per volume per hour.

The reaction temperature may be in the range of about 150 to 400° C., preferably about 160 to 300° C., and the pressure may range from atmospheric to about 150 p.s.i.g., or higher.

The invention will be further illustrated by reference to the following specific examples:

EXAMPLE I

A number of experiments are summarized in Table I below; the experiments were conducted in an identical manner, except for variations in the fuel employed. In each case a gas mixture consisting, by volume, of approximately 3 percent oxygen, 0.3 percent nitric oxide, and the balance nitrogen, was used. The fuel to be evaluated was added to this gas stream and the admixture was passed at the temperatures indicated in the table through a bed of catalyst at the various space velocities indicated in the table. The catalyst used in the entire series of experiments was 0.5 percent palladium on 1/8" cylindrical pellets of activated alumina.

The results are as follows:

Table I

REMOVAL OF NITRIC OXIDE FROM OXYGEN-CONTAINING GAS

[Gas composition: 2.9–3.2% $O_2$, 0.27–0.36% NO, balance $N_2$]
[Catalyst—0.5% Pd on 1/8" activated alumina pellets]

| Fuel | Percent Fuel | Space velocity, vols. gas per vol. catalyst per hour | Catalyst Temp., °C. | Percent NO in effluent | Remarks |
|---|---|---|---|---|---|
| Methane | 2.19 | 16,000 | 210 | 0.39 | |
|  | 2.19 | 16,000 | 270 | 0.34 | |
|  | 2.19 | 16,000 | 335 | 0.060 | Oxygen reacting. |
| Hydrogen | 0.6 | 17,000 | 88 | 0.247 | Do. |
|  | 0.59 | 5,000 | 84 | 0.207 | Do. |
|  | 1.18 | 5,000 | 90 | 0.160 | Do. |
|  | 2.90 | 5,000 | 98 | 0.165 | Do. |
| Carbon Monoxide | 1.5 | 17,000 | 130 | 0.242 | |
|  | 1.5 | 17,000 | 157 | 0.286 | |
|  | 1.5 | 17,000 | 197 | 0.269 | |
|  | 1.5 | 17,000 | 238 | 0.309 | CO and $O_2$ reacting. |
| Ammonia | 1.0 | 17,000 | 160 | 0.206 | |
|  | 1.0 | 17,000 | 204 | 0.0182 | |
|  | 1.01 | 17,000 | 201 | 0.0131 | |
|  | 0.99 | 17,000 | 211 | 0.0221 | |
|  | 0.48 | 17,000 | 202 | 0.0146 | |
|  | 0.48 | 17,000 | 211 | 0.0175 | |

From the foregoing table it is apparent that when methane was used as the fuel, essentially no nitric oxide was removed at temperatures of 210° C. or 270° C., as determined by chemical analysis of the stream after passage through the catalyst bed. At a temperature of 335° C., considerable nitric oxide was removed, but it was apparent that the fuel was also reacting with the oxygen. Although an excess of methane was used in the experiments summarized, other experiments of a similar nature, but employing less than the stoichiometric quantity of methane, showed the same general results, i.e. essentially no nitric oxide removal at temperatures below those at which the fuel-oxygen reaction occurs.

When hydrogen was used as the fuel, about half the nitric oxide was reduced at a temperature in the range of 90 to 98° C., when 1.18 to 2.90 percent hydrogen by volume was present in the stream. It was deduced from temperature measurements that the hydrogen not reacting with the NO was reacting with the oxygen. Inasmuch as less than the stoichiometric amount of hydrogen was used in these experiments, the hydrogen did show some selectivity.

When carbon monoxide was used as the fuel, little or no nitric oxide removal was detected when the amount of carbon monoxide used was one-fourth that required by the oxygen at temperatures in the range of 130 to 197° C. When the temperature was raised slightly, the CO—$O_2$ reaction "took off," producing a temperature of 238° C., but the effluent was still very high in nitric oxide content.

When ammonia was used as the fuel or reductant, the results were quite different from those obtained from the other fuels. At a catalyst temperature of 160° C., about one-third of the nitric oxide was removed, but in the temperature range of 201 to 211° C., the nitric oxide content of the stream was reduced to values in the range of 131 to 221 parts per million. From the standpoint of air pollution, this concentration is acceptable in many situations. Furthermore, it was found possible in later experiments, by altering conditions, to reduce the nitric oxide concentration to much lower values. In the last two experiments summarized in the table, the ammonia used corresponded to only about 12 percent of that required for the reaction of the oxygen and the nitric oxide originally present in the gas.

The data show that ideal or perfect selectivity is not achieved, but rather what might be termed practical selectivity. It is doubtful whether perfect selectivity, i.e. complete reaction of A with B, and no reaction whatsoever of A with C in a system containing all three in admixture, is ever possible. More specifically, the reactions which are believed to apply in this process are:

(3) $\quad 4NH_3 + 3O_2 = 2N_2 + 6H_2O$
(4) $\quad 2NH_3 + 3NO = 5/2 N_2 + 3H_2O$ Thus, for a stream containing 0.3 percent by volume NO, ideal selectivity would require, according to Equation 4 supra, that 0.2 percent by volume of ammonia would remove the NO completely, or alternatively, that if more than 0.2 percent by volume of ammonia were used, the excess would pass through the bed in an unreacted condition. It is probable that in practice the excess ammonia reacts at least in part by Reaction 3, supra. In any event, it is apparent that practical selectivity is achieved in that nitric oxide removals of the order of 90 percent or more are accomplished by the addition of quantities of ammonia which are somewhat greater than those required for stoichiometric reaction with the nitric oxide, but far smaller than those required by reaction with the oxygen.

EXAMPLE II

A gas mixture consisting by volume, of 6.21 percent oxygen, 0.266 percent nitric oxide, 0.98 percent ammonia, and 92.5 percent nitrogen was passed at the rate of 50.8 liters per hour, measured at atmospheric pressure and approximately 70° F., through a glass vessel containing 2.5 grams of 0.5 percent palladium on 1/8" pellets of activated alumina at a temperature of 214° C. A gas sample taken downstream from the catalyst bed showed 0.0274 percent nitric oxide by volume corresponding to a removal of about 90 percent of the nitric oxide.

EXAMPLE III

A gas was passed at the rate of 50.6 liters per hour over 5 grams of the same catalyst described in Example II above. The nitrogen, nitric oxide and ammonia contents of the gas stream were respectively 3.17, 0.27, and 0.99 percent by volume, the balance being nitrogen. The catalyst temperature was 206° C., and a gas sample taken downstream of the catalyst bed showed nitric oxide present in an amount of approximately 0.0030 percent by volume, indicating a removal of almost 99 percent of the incoming nitric oxide.

EXAMPLE IV

A gas was passed at the rate of 103 liters per hour through 5 grams of a catalyst consisting of 0.5 percent palladium on 1/8" activated alumina pellets, corresponding to a space velocity of 17,000 hr.$^{-1}$. The incoming oxygen, nitric oxide and ammonia amounted to 2.88, 0.276 and 0.48 percent by volume of the gas. With a catalyst temperature of 226° C., the downstream nitric oxide was 0.0319 percent.

EXAMPLE V

A gas mixture was prepared which consisted of nitrogen to which had been added, by volume, 3 percent of oxygen, and 0.240 percent of nitric oxide. Ammonia was added to yield a molar ratio of $NH_3$/NO of 1.18. The gas mixture was passed over 33 grams of 0.5 percent Pd on 1/8" activated alumina pellets at an hourly space velocity of 86,000 standard volumes of gas per volume of catalyst. The pressure was 60 p.si.g., the inlet temperature was 260° C. and the outlet temperature was 250° C. Under these conditions, 83.3 percent of the NO was removed. In another test under otherwise unchanged conditions, but increasing the inlet temperature to 301° C., 91.6 percent of the NO was removed.

EXAMPLE VI

A gas mixture was prepared which consisted of nitrogen containing, by volume, 3.2 percent of oxygen and 0.22 percent of nitrogen dioxide. The concentration of ammonia added was 1.2 percent. Using 9 grams of 0.5 percent Pd on ⅛" activated alumina pellets as catalyst, an hourly space velocity of 10,000 standard volumes of gas per volume of catalyst, slightly over atmospheric pressure, and at an inlet temperature of 217° C., 93.4 percent of the nitrogen dioxide was removed from the gas stream.

EXAMPLE VII

A platinum catalyst was tested at atmospheric pressure to remove NO from a mixture containing, by volume, nitrogen with 3.1 to 3.2 percent of oxygen, and 0.33 to 0.34 percent of nitric oxide. Ammonia was added at a concentration, by volume, of either 0.6 or 1.2 percent. Using 9 grams of 0.5 percent Pt on ⅛" activated alumina pellets as catalyst, an hourly space velocity of 10,000 standard volumes of gas per volume of catalyst and inlet temperates ranging from 170° to 209° C., the removal of NO was between 97.1 to 99.9 percent complete, the variation being mainly due to experimental errors.

EXAMPLE VIII

A gas mixture was prepared consisting of nitrogen containing, by volume, 3 percent of oxygen, 0.66 percent of steam and 0.3 percent of nitric oxide. This gas mixture was passed at an hourly space velocity of 10,000 standard volumes of gas per volume of catalyst and at a pressure of 100 p.s.i.g. over 369 grams of 0.5 percent Pt on ⅛" activated alumina pellets at inlet temperatures between 164 and 180° C., ammonia having been added to the gas in various amounts. With addition of 0.3 percent, by volume, ammonia, the effluent gas contained 0.0047 percent NO, with 0.41 percent ammonia, the effluent contained 0.0021 percent NO, and with 0.087 percent ammonia (43 percent of the stoichiometrically required amount of ammonia), the effluent contained 0.15 percent NO.

EXAMPLE IX

A gas mixture was prepared which consisted of nitrogen containing, by volume, 2.9–3.0 percent of oxygen, and 0.22 percent of nitrogen dioxide to which 1.2 percent of ammonia was added. The test pressure was atmospheric. Using 9 grams of 0.5 percent of Pt on ⅛" activated alumina pellets as catalyst, an hourly space velocity of 10,000 standard volumes of gas per volume of catalyst and inlet temperatures ranging from 166° to 237° C., between 92.6 and 99.3 percent of the nitrogen dioxide was removed; the highest removal of 99.3 percent was obtained at an inlet temperature of 196° C.

EXAMPLE X

A gas mixture was prepared which consisted of nitrogen containing, by volume, 5 percent of oxygen, 0.24 percent of nitrogen dioxide, 0.56 percent of nitric oxide, 12 percent of nitrous oxide, and 1.2 percent of ammonia. Using 9 grams of 0.5 percent Pt on ⅛" activated alumina pellets as catalyst, an hourly space velocity of 10,000 standard volumes of gas per volume of catalyst, atmospheric pressure, and inlet temperatures of 149–162° C., the total residual concentration of NO and $NO_2$ in the effluent was between 6 and 14 p.p.m., by volume. Upon increasing the space velocity to 20,000, the NO and $NO_2$ concentration in the effluent increased to 0.0142 percent, and upon decreasing the ammonia concentration to 0.8 percent, the NO and $NO_2$ concentration in the effluent increased to 0.0441 percent.

It will be obvious to those skilled in the art that many modifications may be made within the scope of the present invention without departing from the spirit thereof, and the invention includes all such modifications.

This application is a continuation-in-part of copending application Serial Number 650,862, filed April 5, 1957, and now abandoned.

What is claimed is:

1. A process for effecting selective reduction reactions of gases containing 1 to 22 percent oxygen, trace to 2 percent each of gases selected from the group consisting of NO and $NO_2$, and remainder inert, which comprises contacting in a reaction zone an admixture of the gases and ammonia at reaction temperature with a platinum group metal-containing catalyst whereby selective reduction of the oxides of nitrogen is effected.

2. A process according to claim 1 in which the catalyst is palladium.

3. A process according to claim 1 in which the catalyst is rhodium.

4. A process according to claim 1 in which the catalyst is ruthenium.

5. A process according to claim 1 in which the catalyst is platinum.

6. A process for effecting selective combustion reactions of gases containing 1 to 22 percent oxygen, trace to 2 percent each of gases selected from the group consisting of NO and $NO_2$, and remainder inert, which comprises contacting in a reaction zone an admixture of the gases and ammonia with a platinum group metal-containing catalyst at reaction temperature, the ammonia being present in at least the stoichiometric quantity required for complete reaction with the oxides of nitrogen, whereby selective reduction of the oxides of nitrogen is effected.

7. A process according to claim 6 in which the catalyst is palladium.

8. A process according to claim 6 in which the catalyst is rhodium.

9. A process according to claim 6 in which the catalyst is ruthenium.

10. A process according to claim 6 in which the catalyst is platinum.

11. A process for effecting selective combustion reactions of gases containing 1 to 22 percent oxygen, trace to 2 percent each of gases selected from the group consisting of NO and $NO_2$, and remainder inert, which comprises contacting in a reaction zone an admixture of the gases and ammonia with a platinum group metal-containing catalyst at a temperature in the range of about 150 to 400° C., the ammonia being present in at least stoichiometric quantity required for complete reaction with the oxides of nitrogen, whereby selective reduction of the oxides of nitrogen is effected.

12. A process according to claim 11 in which the catalyst is palladium.

13. A process according to claim 11 in which the catalyst is rhodium.

14. A process according to claim 11 in which the catalyst is ruthenium.

15. A process according to claim 11 in which the catalyst is platinum.

16. A process for effecting selective combustion reactions of gases containing 1 to 22 percent oxygen, trace to 2 percent each of gases selected from the group consisting of NO and $NO_2$, and remainder inert, which comprises contacting in a reaction zone an admixture of the gases and ammonia with a platinum group metal-containing catalyst at a temperature in the range of about 150 to 400° C. and a space velocity in the range of about 3,000 to 100,000 standard volumes of gas per volume of catalyst per hour, the ammonia being present in at least the stoichiometric quantity required for complete reaction with the oxides of nitrogen, whereby selective reduction of the oxides of nitrogen is effected.

17. A process according to claim 16 in which the catalyst is palladium.

18. A process according to claim 16 in which the catalyst is rhodium.

19. A process according to claim 16 in which the catalyst is ruthenium.

20. A process according to claim 16 in which the catalyst is platinum.

References Cited in the file of this patent

UNITED STATES PATENTS

| | | |
|---|---|---|
| 2,076,953 | Lacy | Apr. 13, 1937 |
| 2,475,155 | Rosenblatt | July 5, 1949 |
| 2,606,875 | Rosenblatt et al. | Aug. 12, 1952 |

OTHER REFERENCES

Michailova: "The Kinetics of the Reaction Between Ammonia and Nitric Oxide on the Surface of a Platinum Filament," Acta Physicochimica U.R.S.S., published by the Academy of Sciences of the U.R.S.S., Moscow, vol. 10, No. 5, 1939, pages 653–676.

Rideal and Taylor: Catalysis in Theory and Practice, The Macmillan Co., Ltd., London, 2nd ed., 1926, page 246.